(12) United States Patent
Brassac et al.

(10) Patent No.: US 10,467,101 B2
(45) Date of Patent: Nov. 5, 2019

(54) METHOD OF OBTAINING INFORMATION STORED IN PROCESSING MODULE REGISTERS OF A COMPUTER JUST AFTER THE OCCURRENCE OF A FATAL ERROR

(71) Applicant: BULL SAS, Les Clayes-sous-Bois (FR)

(72) Inventors: Claude Brassac, Saint-Germain-en-Laye (FR); Michel Brunet, Denee (FR)

(73) Assignee: BULL SAS, Les Clayes-sous-Bois (FR)

( * ) Notice: Subject to any disclaimer, the term of this patent is extended or adjusted under 35 U.S.C. 154(b) by 99 days.

(21) Appl. No.: 15/312,782

(22) PCT Filed: May 12, 2015

(86) PCT No.: PCT/FR2015/051242
§ 371 (c)(1),
(2) Date: Nov. 21, 2016

(87) PCT Pub. No.: WO2015/177436
PCT Pub. Date: Nov. 26, 2015

(65) Prior Publication Data
US 2017/0185487 A1 Jun. 29, 2017

(30) Foreign Application Priority Data
May 20, 2014 (FR) ...................................... 14 54504

(51) Int. Cl.
*G06F 11/00* (2006.01)
*G06F 11/14* (2006.01)
(Continued)

(52) U.S. Cl.
CPC ............ *G06F 11/1441* (2013.01); *G06F 1/24* (2013.01); *G06F 11/0724* (2013.01);
(Continued)

(58) Field of Classification Search
CPC .......................... G06F 11/1438; G06F 11/1441
See application file for complete search history.

(56) References Cited

U.S. PATENT DOCUMENTS 5,345,583 A * 9/1994 Davis .................. G06F 11/0757
714/23
6,643,802 B1 11/2003 Frost et al.
(Continued)

OTHER PUBLICATIONS

International Search Report as issued in International Patent Application No. PCT/FR2015/051242, dated Aug. 19, 2015.

*Primary Examiner* — Elmira Mehrmanesh
(74) *Attorney, Agent, or Firm* — Pillsbury Winthrop Shaw Pittman LLP

(57) ABSTRACT

A method of obtaining information stored in registers of at least one processing module of a computer, each processing module including a management controller to read the information stored in the associated registers, and a programmable logic circuit to trigger a requested reset following a fatal error, the method including in the event of reception of a reset request by a programmable logic circuit of a processing module, suspending by the programmable logic circuit the triggering of the reset and alerting the associated management controller of the occurrence of a fatal error, and, if the associated management controller is capable thereof, reading by the associated management controller the information stored in associated and chosen registers then storing by the associated management controller the read information in a file, and authorizing said associated programmable logic circuit to trigger said requested reset.

11 Claims, 2 Drawing Sheets

Figure 1:
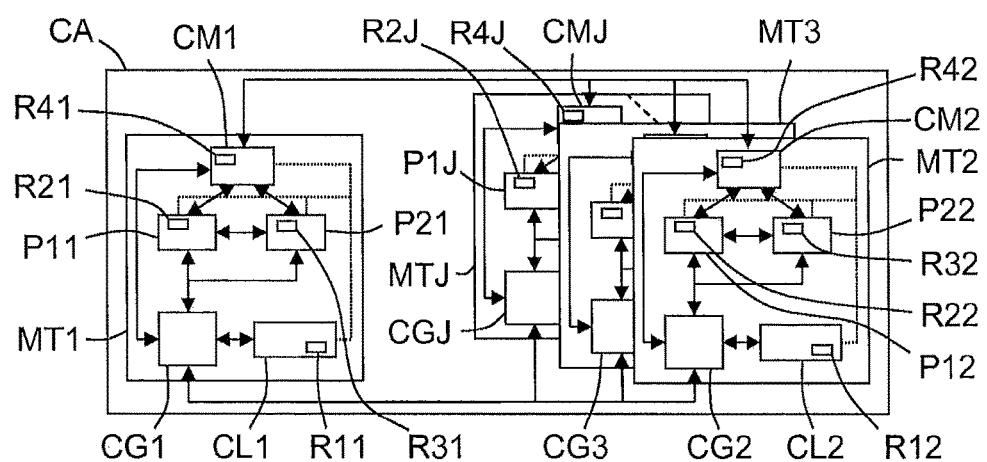

(51) Int. Cl.
  *G06F 11/07* (2006.01)
  *G06F 1/24* (2006.01)
(52) U.S. Cl.
  CPC .... *G06F 11/0778* (2013.01); *G06F 2201/805* (2013.01); *G06F 2201/82* (2013.01)

(56) References Cited

U.S. PATENT DOCUMENTS

| | | | | |
|---|---|---|---|---|
| 6,697,973 | B1* | 2/2004 | Baumeister, IV | G06F 11/0721 714/23 |
| 7,308,609 | B2* | 12/2007 | Dickenson | G06F 11/2268 714/15 |
| 7,313,717 | B2* | 12/2007 | Vecoven | G06F 11/0712 714/4.2 |
| 7,337,367 | B2* | 2/2008 | Mirabeau | G06F 11/0727 714/41 |
| 7,406,624 | B2* | 7/2008 | Robinson | G06F 11/1441 714/23 |
| 7,594,144 | B2* | 9/2009 | Brandyberry | G06F 11/0745 714/34 |
| 8,504,875 | B2* | 8/2013 | Orita | G06F 11/0793 714/26 |
| 2003/0115516 | A1 | 6/2003 | Goldberg et al. | |
| 2007/0083719 | A1* | 4/2007 | Emerson | H04L 63/10 711/150 |
| 2008/0270827 | A1 | 10/2008 | Brandyberry et al. | |
| 2012/0222031 | A1* | 8/2012 | Derr | G06F 9/5027 718/100 |
| 2012/0233499 | A1* | 9/2012 | Estaves | G06F 9/45533 714/23 |
| 2015/0095700 | A1* | 4/2015 | Arroyo | G06F 11/2002 714/17 |
| 2015/0127969 | A1* | 5/2015 | Arroyo | G06F 11/2097 714/4.5 |

\* cited by examiner

METHOD OF OBTAINING INFORMATION STORED IN PROCESSING MODULE REGISTERS OF A COMPUTER JUST AFTER THE OCCURRENCE OF A FATAL ERROR

CROSS REFERENCE TO RELATED APPLICATIONS

This application is the U.S. National Stage of PCT/FR2015/051242, filed May 12, 2015, which in turn claims priority to French Patent Application No. 1454504 filed May 20, 2014, the entire contents of all applications are incorporated herein by reference in their entireties.

The invention relates to computers comprising at least one processing module comprising a management controller (sometimes called "service processor") and a programmable logic circuit (or FPGA ("Field Programmable Gate Array")), that makes it possible to obtain information stored in registers of various hardware components of a processing module in case of the occurrence of a fatal error.

The term "computer" here means a computer comprising one or several processing modules that can perform tasks in parallel and/or in series. Each processing module is provided with a management controller, at least one processor, a programmable logic circuit and a coherent memory switch (such as for example a BCS2 ("Bull Coherent Switch release 2") providing coherency for the memoires between the various processing modules and as such making it possible to make the operating system (or OS) believe that its processing modules form a single module. By way of example, this can be a computer of the company server type or a computer used as a calculating (or service) node of a supercomputer.

As known by those skilled in the art, when a computer (such as for example a server) breaks down following the occurrence of a fatal error due to hardware, it is indispensable to know at least some of the information that is stored in certain internal registers of some of its components just after the occurrence of this fatal error, in order to be able to determine the source of the latter and therefore the component with the error situation. This is in particular the case with the registers of the processor or processors (or CPU ("Central Processing Unit")), of the programmable logic circuit (or FPGA ("Field Programmable Gate Array")) and of the coherent memory switch (or BCS ("Bull Coherent Switch")).

For this type of severe error, the operating system (or OS) cannot obtain any information via its own internal error handling mechanisms ("Error Handler") because the computer is considered to be corrupt and has to be restarted as quickly as possible before any vital data is corrupted. As such, a CPU having been subjected to a fatal error decides on its own to restart (or "reset") its computer, which prevents the associated operating system from taking control.

This restarting erases the content of the volatile registers and therefore prevents any obtaining of information after it has taken place, other than that which is stored in the so-called "sticky" registers, and again in a very particular situation.

The invention therefore has for purpose in particular to improve the situation, and in particular to allow for the obtaining, following the occurrence of a fatal error, of information stored in certain registers of each processing module of a computer wherein each processing module further comprises a management controller, able to read the information stored in the associated registers, and a programmable logic circuit able to trigger a reset requested following a fatal error.

It proposes in particular for this purpose a method wherein, in the event of reception of a reset request by a programmable logic circuit of a processing module, this programmable logic circuit suspends the triggering of this reset and alerts the occurrence of a fatal error to the associated management controller which, if it is capable thereof, reads the information stored in associated and chosen registers, then stores this read information in a file, then the associated programmable logic circuit is authorised to trigger this requested reset.

The content of certain registers can as such be retrieved practically in real time, and more precisely just after the reporting of the occurrence of a fatal error, with the purpose of analysing the cause of the latter.

The method according to the invention can comprise other characteristics that can be taken individually or in combination, and in particular:

when the management controller cannot read the information stored in the associated and chosen registers, the associated programmable logic circuit can be authorised to trigger the requested reset, and a reset phase can be blocked on a point of synchronisation between the management controller and a basic input/output system of the processing module, then the management controller can read the information stored in associated and chosen registers, then store this read information in a file, then the computer can be restarted;

each management controller can choose associated registers from a list of registers that it stores;

the list can contain a first part comprising registers to be read before a reset, and a second part comprising registers to be read after a reset;

in the presence of a master processing module and of at least one slave processing module, when a slave processing module comprises a programmable logic circuit that has received a reset request, the associated management controller can alert the management controller of the master processing module of the occurrence of a fatal error in its slave processing module, then the management controller of the master processing module can transmit to the management controller of each processing module an authorisation for the synchronised reading of the information stored in associated and chosen registers as well as an instance name for the file in which it must store this read information;

the management controller of each processing module can report on the generation of its file to the management controller of the master processing module, and the management controller of the master processing module can inform each programmable logic circuit of a processing module that it is authorised to trigger a reset when it has received a file generation report from each management controller of a processing module, then the management controller of the master processing module can trigger a restarting of the computer;

before triggering the restarting of the computer, the management controller of the master processing module can generate an alert message in order to report that the files have been stored in each one of the master and slave processing modules.

The invention also proposes a computer programme product comprising a set of instructions that, when it is executed for the processing means, is able to implement a method of control of the type of the one presented hereinabove to obtain information stored in registers of at least one processing module of a computer following the occurrence of a fatal error.

The invention also proposes a computer comprising at least one processing module comprising registers that store information, a management controller able to read the information stored in these registers, and a programmable logic circuit able to trigger a requested reset following a fatal error. In the event a reset request is received by a programmable logic circuit of a processing module, this programmable logic circuit is arranged to suspend the triggering of this reset and to alert the occurrence of a fatal error to the management controller that is associated to it, and the latter is arranged, if it is capable thereof, to read the information stored in associated and chosen registers, then to store this read information in a file, before the associated programmable logic circuit if authorised to trigger the requested reset.

For example, when the management controller cannot read the information stored in the associated and chosen registers, the associated programmable logic circuit can be arranged, if it is authorised, to trigger the requested reset, and, this management controller can be arranged, following a blocking of a reset phase on a synchronisation point between it and a basic input/output system of its processing module, to read the information stored in associated and chosen registers, then to store this read information in a file.

Figure 2:
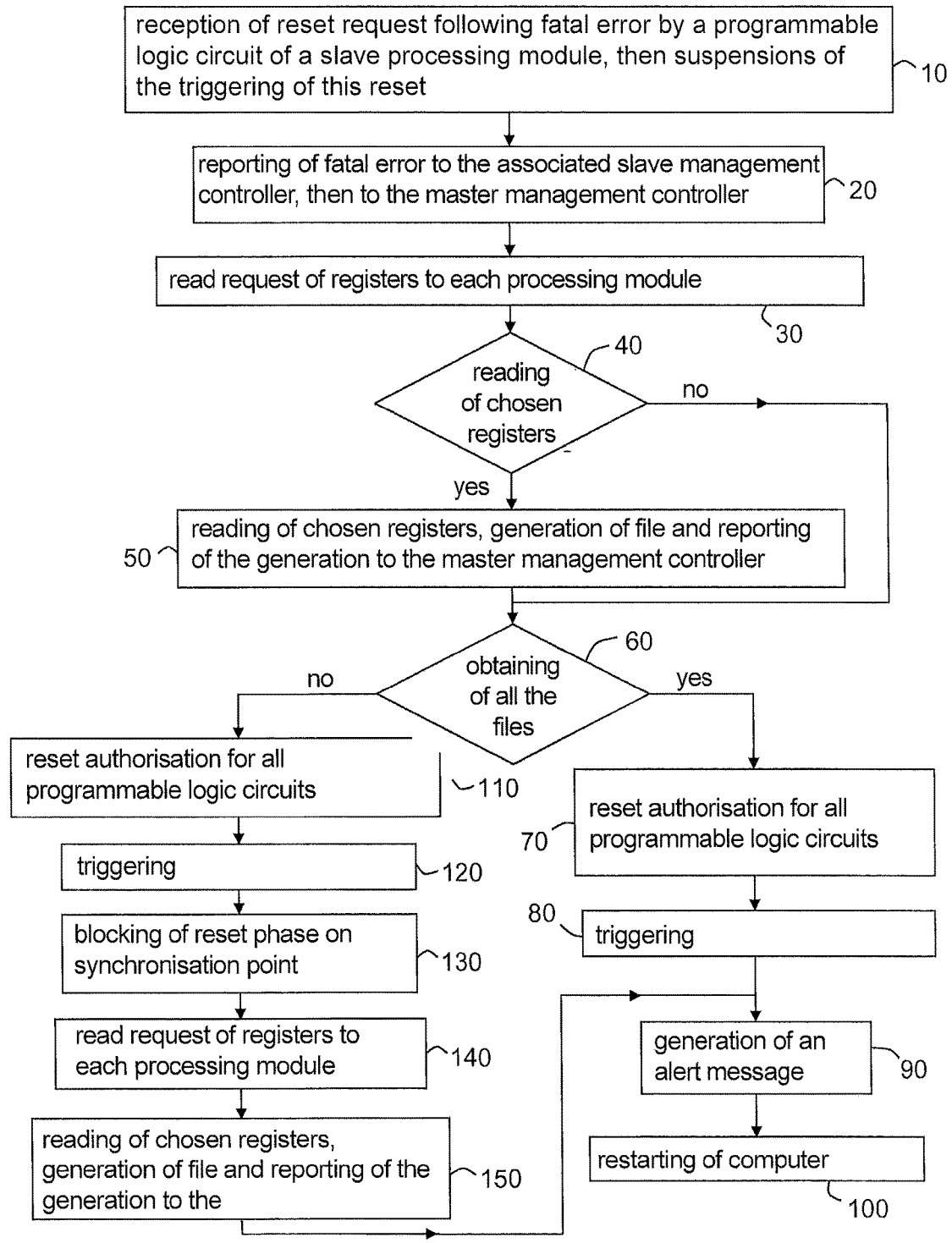

Other characteristics and advantages of the invention shall appear when examining the detailed description hereinafter, and the annexed drawings, wherein:

FIG. 1 diagrammatically and functionally shows a computer with J processing modules according to the invention, and FIG. 2 shows an example of an algorithm implementing a method of obtaining information according to the invention.

The invention has in particular for object to propose a method intended to allow for the obtaining of information stored in the registers Rij of at least one processing module MTj of a computer CA following the occurrence of a fatal error.

It is considered in what follows, by way of a non-limiting example, that the computer CA is a company server. But the invention is not limited to this type of computer. It indeed relates to any computer system comprising one or several processing modules that can perform tasks in parallel and/or in series. As such, this can also be a computer used a calculation (or service node of a supercomputer.

FIG. 1 diagrammatically shows a non-limiting example of computer CA, here a server, comprising J processing modules MTj (j=1 to J). For example, J is equal to 8. But J can have any value greater than or equal to one.

Among these J processing modules MTj, one of them is referred to as master, while the J-1 others are referred to as slaves.

Each processing module MTj comprises at least registers Rij that store information, a management controller (or "management controller") CGj, able to read the information that is stored in these registers Rij, a programmable logic circuit (or FPGA ("Field Programmable Gate Array")) CLj, able to trigger a reset that was requested following the occurrence of a fatal error due to hardware, a basic input/output system (BIOS—not shown here), memories (not shown), and at least one processor (or CPU ("Central Processing Unit")) P1j or P2j.

Note that when the computer CA comprises several processing modules MTj, as shown in FIG. 1, each one of the latter (MTj) also comprises a coherent memory switch CMj (such as for example a BCS2 ("Bull Coherent Switch release 2") that provides the coherency of the memories between the various processing modules MTj and as such makes it possible to make the operating system (or OS) believe that its processing modules MTj form a single module. In other terms, each coherent memory switch CMj makes it possible to offer coherent access to any memory of any processing module MTj from any processor P1 J, P2j of any processing module MTj.

Each management controller CGj provides a functions called SMC ("Satellite Management Controller") which manages the access to the hardware of its processing module MTj, such as for example the reading of a register of processor P1j or P2j or of a coherent memory switch CMj or the access to a temperature sensor.

The management controller CG1 of the master processing module MT1 assure, in addition to a management controller CGj' (j'≠1) of a slave processing module MTj', a function called BMC ("Baseboard Management Control") which in particular manages the turning off ("power off") and starting up (or ("power on")) of the computer CA, the resets, the authorisations for reading registers Rij, and the inter-processing module MTj synchronisation.

Also note that the registers Rij of each processing module MTj, that are concerned by the invention (and therefore in which information has to be retrieved in the event of a fatal error), are part of the programmable logic circuit CLj (here R1j), of each processor (here R2j and R3j), and of the coherent memory switch CMj (here R4j).

Within each processing module MTj, the communications between the management controller CGj and the coherent memory switch CMj can take place via an interface I2C, the communications between the processors P1j and P2j and the coherent memory switch CMj can take place via a QPI interface ("Quick Path Interconnect"), the communications between the management controller CGj and the processors P1j and P2j can take place via a PECI interface, and the communications between the management controller CGj and the programmable logic circuit CLj can take place via an xbus interface.

Moreover, the communications between the coherent memory switches CMj of the various processing modules MTj can take place via a communications network of the XQPI type ("eXtended QPI"), and the communications between the management controllers CGj of the various processing modules MTj can take place via an Ethernet network.

As indicated hereinabove, the invention proposes a method intended to allow for the obtaining of information stored in the registers Rij of each processing module MTj of a computer CA.

This method can be implemented by a computer CA according to the invention, each time that a programmable logic circuit CLj of a processing module MTj receives a reset request from a processor P1j, P2j or from the coherent memory switch CMj following the occurrence of a fatal error. According to this method, when the abovementioned situation occurs, the programmable logic circuit CLj concerned suspends the triggering of the requested reset and alerts the occurrence of a fatal error to the management controller CGj that is associated to it within its processing module MTj.

Then, if this management controller CGj is capable of doing so (i.e. it has the possibility), it reads the information that is stored in associated and chosen registers Rij of its processing module MTj, then stores this read information in a file. Then, the programmable logic circuit CLj, that received the reset request, is authorised to trigger the requested reset (and that it had suspended while waiting for instructions).

The reading capacity of a management controller CGj depends above all on the technical possibility of access the registers Rij at the instant in consideration, as well as possibly the receiving of an authorisation to read.

It is important to note that, when the computer CA comprises several processing modules MTj, of which one master MT1 and at least one slave MTj', and that a slave processing module MTj' comprises a programmable logic circuit (slave) CLj' that has received a reset request, the associated slave management controller CGj' can alert the management controller (master) CG1 of the master processing module MT1 of the occurrence of a fatal error in its slave processing module MTj'. Then, the master management controller CG1 can transmit to the management controller CGj of each processing module MTj (j=1 to J) an authorisation for the synchronised reading of the information stored in associated and chosen registers Rij and an instance name for the file in which it must store this read information. This file is stored in a non-volatile memory (for example of the flash type) of the management controller CGj. In other terms, it is the master management controller CG1 that supervises and authorises the reading of the chosen registers in each one of the master MT1 and slave MTj' processing modules.

This option is intended to retrieve the information stored in all of the useful register Rij of all of the processing modules MTj, including those that were not subject to the fatal error, in order to be able to know the origin of the problem. Indeed, transactions circulate between the processing modules MTj and therefore a fatal error can be detected by a "consuming" processing module although the fatal error comes from an "emitting" processing module, and therefore all of the management controllers CGj have to be alerted that a fatal error has occurred in computer CA so that they can retrieve the information stored in their respective registers Rij. Note however that when a fatal error occurs, it can propagate from chip to chip and from processing module MTj to processing module MTj'. Consequently, it can arise that this fatal error triggers others in a burst mechanism in the same processing module MTj, and in this case reading "cascading" registers Rij must be avoided.

Preferably, each management controller CGj reports the generation of its file to the master management controller CG1, then the latter (CG1) informs each programmable logic circuit CLj that it is authorised to trigger a reset if it has received a file generation report from each management controller CGj. Then, the master management controller CG1 can trigger a restarting (or "reboot") of the computer CA.

Note that before triggering this restarting of the computer CA, the master management controller CG1 can generate an alert message intended to report to a person who is responsible for this computer CA that the files relating to the occurrence of a fatal error have been stored in each one of the master and slave processing modules MTj. These files can then be downloaded on a computer and analysed using a diagnostic tool.

Also note that it may arise that a management controller CGj cannot read the information that is stored in the associated and chosen registers Rij, for example after having possibly received the authorisation from the master management controller CG1. This situation can for example occur in certain particularly serious fatal error situations when a management controller CGj no longer has access to the processors P1j and P2j and/or to the coherent memory switch CMj because their access buses (PECI and I2C) are blocked.

In this latter case, the programmable logic circuit CLj that is associated with this management controller CGj can first of all be authorised to trigger the requested reset, and a reset phase can be blocked on a synchronisation point between this management controller CGj and the basic input/output system (or BIOS) of its processing module MTj. This reset has for effect to unblock the data buses and therefore to allow the management controller CGj to again access the processors P1j and P2j and the coherent memory switch CMj, and the blocking of the BIOS immediately after this reset makes it possible to prevent the restarting of it from corrupting the contents of the sticky registers. It is understood that in this case only the sticky registers will be read, since all of the other registers will have been set to their post-reset values (generally zero) while these sticky registers retain their pre-reset values. The information retrieved in this case will not be as complete purpose can however be sufficient in many situations.

Then, the management controller CGj can read the information that is stored in the associated and chosen registers Rij of its processing module MTj, possibly after having been authorised to do so by the master management controller CG1. In fact, only registers of the "sticky" type can be read without fear of having been corrupted by the reset that has just occurred. Then, this management controller CGj can place this read information in a file that it stores in a non-volatile memory (for example of the flash type). Finally, the computer CA can be restarted by performing a procedure referred to as "power cycle" consisting in turning off the computer CA then in turning it back on in order to reset the registers of the sticky type to their respective default values. This procedure is useful after a fatal error because the coherency of the content of the sticky registers is not assured. For example, this restarting can be triggered by the master management controller CG1.

In order to accelerate the reading of the registers Rij, each management controller CGj can choose the registers Rij that it is authorised to read in its processing module MTj from a list of registers that it stores in a non-volatile memory. For example, this list can contain a first part comprising registers that have to be read before a reset has been performed, and a second part comprising registers that have to be read after a reset has been performed. The registers of this first part belong primarily to the processors P1j and P2j and to the programmable logic circuit CLj (the latter in particular contains an important piece of information that indicates the first fatal error that occurred in the computer CA (which processor or which coherent memory switch CMj of which processing module MTj)). The registers of this second part are primarily of the sticky type, and therefore are part of the coherent memory switches CMj and of the processors P1j and P2j (these are for example registers of the CSR type ("Control and Status Register") with "Bus/Device/function" addressing), Note that the first part of the list can possibly and advantageously be subdivided into subparts associated with the various types of processors P1j, P2j and with the programmable logic circuit CLj (error registers with "Page/Offset" addressing). For example, a subpart can be dedicated to registers of the MSR type ("Model Specific Register") with "Offset+CoreID" addressing of a type of processor, and another subpart can be dedicated to registers of the CSR type with "Bus/Device/function" addressing of another type of processor. When this option exists, each management controller CGj begins by determining the type of the processor that it must address, then it selects the subpart of the first part of the list which is associated with this type of processor. This makes it possible to have the same programme in each management controller CGj regardless of the type or types of processors that its processing module MTj comprises.

FIG. 2 diagrammatically shows an example of an algorithm that implements an example of the method of obtaining information according to the invention.

This algorithm comprises a step 10 wherein a slave programmable logic circuit CLj' (for example CL2) receives a reset request due to the occurrence of a fatal error in its slave processing module MT2, and consequently suspends the triggering of this reset.

The algorithm continues with a step 20 wherein the slave programmable logic circuit CL2 alerts the associated management controller CG2 of the occurrence of a fatal error. Then, the latter (CG2) alerts the master management controller CG1 of the occurrence of a fatal error in its slave processing module MT2.

Then, in a step 30, the master management controller CG1 transmits to each one of the management controllers CG1 to CGJ an authorisation for the synchronised reading of the information which is stored in associated and chosen registers Rij of their respective processing modules MT1 to MTJ, as well as in instance name for the files wherein they will store the information that they were able to read.

Then, in a step 40, each management controller CGj (j=1 to J) determines whether it is possible to read the information that is stored in associated and chosen registers Rij (for example those predefined from the first group of the stored list). In the negative, control passes to a step 60. On the other hand, in the affirmative a step 50 is carried out wherein each management controller CGj reads the information that is stored in the associated and chosen registers Rij, then stores this read information in a file that has the instance number supplied by the master management controller CG1, then reports the generation of its file to the master management controller CG1.

Then, in a step 60, the master management controller CG1 performs a test in order to determine if it has received the J files of the J processing modules MTj. In the negative on a step 110 is carried out which shall be described hereinafter. In the affirmative a step 70 is carried out wherein the master management controller CG1 informs each programmable logic circuit CLj (whether it is slave or master) that it is authorised to trigger a reset of its processing module MTj.

Then, in a step 80, each slave programmable logic circuit CLj (whether it is slave or master) triggers a reset of its processing module MTj.

Then, in a step 90, the master management controller CG1 generates an alert message intended to report to a person responsible for its computer CA that files concerning the occurrence of a fatal error have been stored in each one of the master and slave processing modules MTj.

Then, in a step 100, the master management controller CG1 triggers a restarting (or "reboot") of the computer CA of the power cycle type.

When the test performed in the step 60 is negative, and therefore at least one register Rij was not able to be read in at least one processing module MTj, a step 110 is carried out wherein the master management controller CG1 informs each programmable logic circuit CLj (whether it is slave or master) that it is authorised to trigger a reset of its processing module MTj.

Then, in a step 120, each slave programmable logic circuit CLj (whether it is slave or master) triggers a reset of its processing module MTj in order to unblock the data buses.

Then, in a step 130, each management controller CGj (whether it is slave or master) blocks the reset phase on a synchronisation point between it (CGj) and the basic input/output system (or BIOS) of its processing module MTj in order to prevent the restarting of the BIOS from corrupting the contents of the sticky is registers.

Then, in a step 140, the master management controller CG1 transmits to each one of the management controllers CG1 to CGJ an authorisation for the synchronised reading of the information that is stored in associated and chosen registers Rij of their respective processing modules MT1 to MTJ, as well as an instance name for the files wherein they will store the information that they were able to read.

Then, in a step 150 each management controller CGj reads the information that is stored in the associated and chosen registers Rij (for example those of the second group of the stored list), then stores this read information in a file that has the instance number supplied by the master management controller CG1, then reports the generation of its file to the master management controller CG1.

Then, the steps 90 and 100 described hereinabove are carried out.

Note that invention can also be considered in the form of a computer programme product comprising a set of instructions that, when it is executed by processing means of a computer CA, is able to implement a method of control of the type of the one described hereinabove in order to obtain information stored in the registers Rij of at least one processing module MTj of the computer CA following the occurrence of a fatal error.

The invention is not limited to the embodiments of the method of obtaining information and the computer described hereinabove, only by way of example, but it encompasses all of the alternatives that those skilled in the art could consider in the framework of the claims hereinafter.

The invention claimed is:

1. A method of obtaining information stored in registers comprised in at least one processing module of a computer, the processing module further comprising a programmable logic circuit and a management controller, the management controller being configured to read the information stored in the registers, and the programmable logic circuit being configured to trigger a warm reset following a fatal error, the method comprising:
    responsive to reception, by the programmable logic circuit, of a request for the reset to be triggered, suspending, by the programmable logic circuit, the triggering of the reset and alerting the management controller of an occurrence of the fatal error;
    selecting the registers from among a list of registers;
    responsive to reception, by the management controller, of the alert, determining whether the management controller is capable of reading the information stored in the selected registers;
    responsive to a determination that the management controller is capable of said reading, reading, by the management controller, the information stored in the registers and storing, by the management controller, the read information in a file; and
    authorizing said programmable logic circuit to trigger said reset.

2. The method according to claim 1, further comprising:
responsive to a determination that the management controller is not capable of said reading, authorizing said programmable logic circuit to trigger said reset;
blocking activity associated with the reset at a synchronisation point between said management controller and a basic input/output system (BIOS) of said processing module;
while blocked, reading, by said management controller, the information stored in the registers;
storing the read information in a file; and
power cycling, after said storage, said computer.

3. The method according to claim 1, wherein the registers are selected by the management controller, the selected registers including (i) a first register that is associated with a processor of the processing module, (ii) a second register that is associated with the programmable logic circuit, and (iii) a third register that is associated with a coherent memory switch of the processing module.

4. The method according to claim 1, wherein said list comprises first registers to be read before the reset and second registers to be read after the reset.

5. The method according to claim 1, wherein the computer comprises a master processing module and at least one slave processing module, the method further comprising:
when each of the at least one slave processing module comprises a programmable logic circuit that has received a reset request, alerting, by a management controller of the each slave processing module, a management controller of said master processing module of an occurrence of a fatal error in the each slave processing module; and
transmitting, by said management controller of the master processing module to the management controller of the each slave processing module, (i) an authorisation for a synchronised reading of information stored in registers associated with the each slave processing module and (ii) an instance name for a file wherein the each slave processing module is to store the to be read information.

6. The method according to claim 5, the method further comprising:
reporting, by the management controller of the each slave processing module, on generation of the file to said management controller of the master processing module;
informing, by said management controller of the master processing module, each programmable logic circuit of the each slave processing module that the each programmable logic circuit is authorised to trigger a reset, when the management controller of the master processing module has received the file generation report from the management controller of the each slave processing module; and
triggering, by said management controller of the master processing module, a power cycling of said computer.

7. The method according to claim 6, the method further comprising:
before said triggering of said power cycling of the computer, generating, by said management controller of the master processing module, an alert message in order to report that the files have been respectively stored in each one of said master and slave processing modules.

8. The method according to claim 1, wherein the fatal error takes place in a memory coherent switch comprised in the processing module.

9. A non-transitory computer program product comprising a set of instructions, which, when executed by a computer, causes the computer to perform the following operations:
responsive to reception, by a programmable logic circuit of at least one processing module of the computer, of a request for a warm reset to be triggered, suspending, by the programmable logic circuit, the triggering of the reset and alerting a management controller of an occurrence of a fatal error, wherein the programmable logic circuit is configured to trigger the reset following the fatal error;
selecting registers comprised in the processing module from among a list of registers, wherein the processing module further comprises the management controller, the management controller being configured to read information stored in the selected registers;
responsive to reception, by the management controller, of the alert, determining whether the management controller is capable of reading the information stored in the selected registers;
responsive to a determination that the management controller is capable of said reading, reading, by the management controller, the information stored in the registers and storing, by the management controller, the read information in a file; and
authorizing said programmable logic circuit to trigger said reset.

10. A computer, comprising:
at least one processing module comprising registers that store information,
a management controller configured to read the information stored in said registers, wherein the registers are selected from among a list of registers, and
a programmable logic circuit configured to trigger a warm reset following a fatal error,
wherein, responsive to reception, by the programmable logic circuit, of a request for the reset to be triggered, the programmable logic circuit is configured to suspend the triggering of the reset and to alert said management controller of an occurrence of the fatal error, and
wherein the management controller is configured to read the information stored in the registers, responsive to a determination that the management controller is capable of said reading, the determination being made responsive to reception, by the management controller, of the alert, and
wherein the management controller is further configured to store the read information in a file, before said programmable logic circuit is authorised to trigger said reset.

11. The computer according to claim 10, wherein, when said management controller cannot read the information stored in the registers, said programmable logic circuit is configured, if it is authorised, to trigger said reset, and,
wherein said management controller is configured, responsive to blocking activity associated with the reset at a synchronisation point between the management controller and a basic input/output system (BIOS) of the processing module, to read the information stored in the registers and to store the read information in a file.

* * * * *